United States Patent
Rapp et al.

(10) Patent No.: US 6,853,900 B2
(45) Date of Patent: Feb. 8, 2005

(54) PRESSURE CONTROL DEVICE AND METHOD FOR PROGRAM-CONTROLLED ACTUATION OF A PRESSURE-REGULATING MECHANISM

(75) Inventors: Bernd Rapp, Hemmingen (DE); Tobias Ernst, Waiblingen (DE); Thomas Mueller, Leonberg (DE); Uwe Maienberg, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/168,555

(22) PCT Filed: Sep. 8, 2001

(86) PCT No.: PCT/DE01/03454

§ 371 (c)(1),
(2), (4) Date: Oct. 16, 2002

(87) PCT Pub. No.: WO02/35485

PCT Pub. Date: May 2, 2002

(65) Prior Publication Data

US 2003/0149519 A1 Aug. 7, 2003

(30) Foreign Application Priority Data

Oct. 25, 2000 (DE) .......................................... 100 52 794

(51) Int. Cl.$^7$ .............................................. G06F 17/00
(52) U.S. Cl. .......................................... 701/51; 701/64
(58) Field of Search ....................... 701/51, 66; 477/68, 477/80, 156, 143, 144, 132; 192/48.4, 109 F, 48.7, 48.92

(56) References Cited

U.S. PATENT DOCUMENTS

| 4,855,913 | A | | 8/1989 | Brekkestran et al. ......... 701/66 |
| 5,782,711 | A | * | 7/1998 | Tsutsui et al. ............... 477/156 |
| 6,068,576 | A | * | 5/2000 | Tsutsui et al. ............... 477/144 |

FOREIGN PATENT DOCUMENTS

| DE | 42 37 878 | 5/1994 |
| EP | 0 744 565 | 11/1996 |
| WO | WO 00 34691 | 6/2000 |

* cited by examiner

Primary Examiner—Thomas G. Black
Assistant Examiner—Christine M. Behncke
(74) Attorney, Agent, or Firm—Walter Ottesen (57) ABSTRACT

A pressure control for the program-controlled drive of at least one pressure actuating member influences the hydraulic constellation in a transmission via the pressure (p). The program-controlled drive takes place via changes of states (z; Z0, Z1, Z2, Z3, Z4, Z5, Z6, Z7) from current states (z(t)) to subsequent states (z(t+1)) and that the states (z; Z0, Z1, Z2, Z3, Z4, Z5, Z6, Z7) are all configurable without change of program. A method is provided for the program-controlled drive of at least one pressure actuating member.

32 Claims, 6 Drawing Sheets

PRESSURE CONTROL DEVICE AND METHOD FOR PROGRAM-CONTROLLED ACTUATION OF A PRESSURE-REGULATING MECHANISM

This application is the national stage of PCT/DE 01/03454, filed on Sep. 8, 2001, designating the United States.

FIELD OF THE INVENTION

The present invention relates to a pressure control for the program-controlled drive of at least one pressure actuating member in order to influence the hydraulic constellation in a transmission via the pressure. Furthermore, the present invention relates to a method for the program-controlled drive of at least one pressure actuating member in order to influence the hydraulic constellation in a transmission via the pressure.

BACKGROUND OF THE INVENTION

It is known to equip transmissions such as stepped automatic transmissions or continuously variable transmissions (continuously variable transmission=continuously variable transmission ratio) with pressure controls which drive one or more pressure actuating members in a transmission in order to influence the hydraulic constellation in the transmission. The required type of drive is dependent upon the transmission type as well as the transmission manufacturing series. For this reason, up to now, pressure controls or methods for the program-controlled drive of at least one pressure actuating member have been used especially adapted to a type of transmission or a transmission series, which has caused a correspondingly high cost complexity with respect to development.

SUMMARY OF THE INVENTION

The following embodiments relate to the pressure control according to the invention as well as to the method according to the invention.

One and the same pressure control having comparatively low complexity can be adapted to various transmission types or transmission series because of the following: the program-controlled drive of at least one pressure actuating member is provided in the pressure control of the invention and in the method of the invention; the program-controlled drive takes place via changes of conditions of current states to subsequent states; and, the states can be configured without change of program. Stated otherwise, the pressure control of the invention can be configured only with data for a specific transmission type or for a specific transmission series. Furthermore, the pressure control of the invention can be adapted with little complexity even to different transmission types (for example: stepped automatic, continuously variable transmission, automatic shift transmission) because at least a large part of the program can be taken over unchanged.

The following embodiments relate to the pressure control of the invention as well as to the method of the invention.

Preferably, it is provided that the states are coordinated via a status machine. The parameters of such a state machine can, for example, be defined by a table. Each entry of the table can have the following component entries:

an indication as to a base pressure function explained in detail hereinafter;

an indication as to an offset pressure function likewise explained in greater detail hereinafter;

an indication as to a gradient function likewise explained in greater detail hereinafter; and, an indication as to one or more subsequent states.

Furthermore, criteria can be provided wherein a change from a current state to a subsequent state takes place with the satisfaction of at least one criterion. An indication as to a criterion or several criteria can likewise be the subject matter of a table entry.

The criteria, which lead to a change from a current state to a subsequent state, can include time criteria. These time criteria can either lead to a movement out of a state after a pregiven fixed time span or a state can be moved out of after a computed or estimated time span.

Furthermore, it is conceivable that the criteria whose satisfaction causes a change from a current state to a subsequent state can include event criteria. Such an event criterion can, for example, concern the reaching of a pregiven pressure. Likewise, it is, however, conceivable that the event criteria consider some transmission states and/or other ambient states.

In a preferred embodiment of the present invention, it is provided that the pressure control coacts with a shift sequence control which coordinates shifts which correspond to changes of constellations in a transmission wherein a change of the constellation results in a change of the force transmission of the transmission and wherein a sequence of shifting is subdivided into phases. In a similar manner, the method of the invention can coact with a method for coordinating corresponding shifting sequences. In this connection, embodiments are possible wherein specific phases request specific states and/or wherein specific states request specific phases.

For this purpose, the states are preferably assigned to the phases.

Several states can be assigned to one phase. In this case too, the phase boundaries are preferably coincident with state boundaries.

In a specific embodiment of the present invention, a phase e(z) is assigned to each state z and the following applies:

$$z(t+1) = \begin{cases} z(t)+1; & \text{if } e(z) < \text{phase}(t) \text{ and } e(z+1) \leq \text{phase}(t) \\ z(t)+1; & \text{if } trg_{m(Z)} = 1 \text{ and } e(z+1) \leq \text{phase}(t) \\ z(t); & \text{otherwise} \end{cases}$$

wherein: $trg_{m(z)}=1$ is satisfied when a criterion is satisfied and wherein the phase (t) relates to a subsequent phase insofar as a phase change is to occur. From this relationship, it results that there can especially be a change from a current state to a subsequent state when the phase changes or when a criterion is satisfied. Each time the phase changes, a check is made as to whether the phase, which is assigned to the current state, is less than or equal to the new phase. In this case, the current state is left and there is a branching to a subsequent state, for example, the next state.

Preferably, it is further provided that a desired pressure trace at a time point (t) is given as:

$$p_s(t)=p_s p_s(t)+p_o(t),$$

wherein $p_s$ is a base pressure and $p_o$ is an offset pressure. For the base pressure, the following preferably applies:

$$p_B(t)=f_{i(z)}(t, \vec{x}) \text{ with } z=z(t),$$

wherein: $f_{i(z)}$ is a base pressure function which can be selected from a quantity i of base pressure functions; and, wherein the vector $\vec{x}$ indicates the states of the transmission and/or the ambient. Each base pressure function $f_{i(z)}$ can, for example, be a constant, a function of the first order or another suitable function, which is provided in correspondence to the type of transmission or the transmission series.

Furthermore, the following preferably applies for the offset pressure:

$$p_o(t) = \begin{cases} p_o(t-1) + \int g_{j(z)}(t,\vec{x})dt, & \text{if } z := z(t) = z(t-1) \\ h_{k(z)}(t, p_o(t-1), \vec{x}); & \text{if } z := z(t) \neq z(t-1) \end{cases}$$

wherein $g_{j(z)}(t, \vec{x})$ is a pressure gradient function, which is selectable from a quantity j of gradient functions; and, wherein $h_{k(z)}(t, p_o(t-1), \vec{x})$ is a state change function which is selectable from a quantity k of state change functions; and wherein the vector $\vec{x}$ indicates the states of the transmission and/or of the ambient. The functions $g_{j(Z)}$ and $h_{k(Z)}$ can also, for example, be defined by a constant, a function of the first order or another suitable function, which is provided in correspondence to the type of transmission or the transmission series.

The states of the ambient, which are considered via the vector $\vec{x}$, can, for example, be: the type of shift and/or the output rpm and/or the oil temperature and/or the engine rpm and/or the engine output torque and/or the throttle flap position. In this way, the pressure control of the invention as well as the method of the invention are adaptable to the most varied transmission types and vehicles.

Furthermore, it can be provided that the temperature-dependent non-linearities are compensated by a temperature compensation device. This compensation can, for example, take place via a component of the offset pressure. Likewise, it can be provided that transmission variables and/or ambient variables are coupled back via a feedback unit. A feedback of the above kind can also be considered in the form of a component of the offset pressure.

BRIEF DESCRIPTION OF THE DRAWING

The invention will now be explained with reference to the drawings wherein.

DESCRIPTION OF THE PREFERRED EMBODIMENTS OF THE INVENTION

Figure 1:
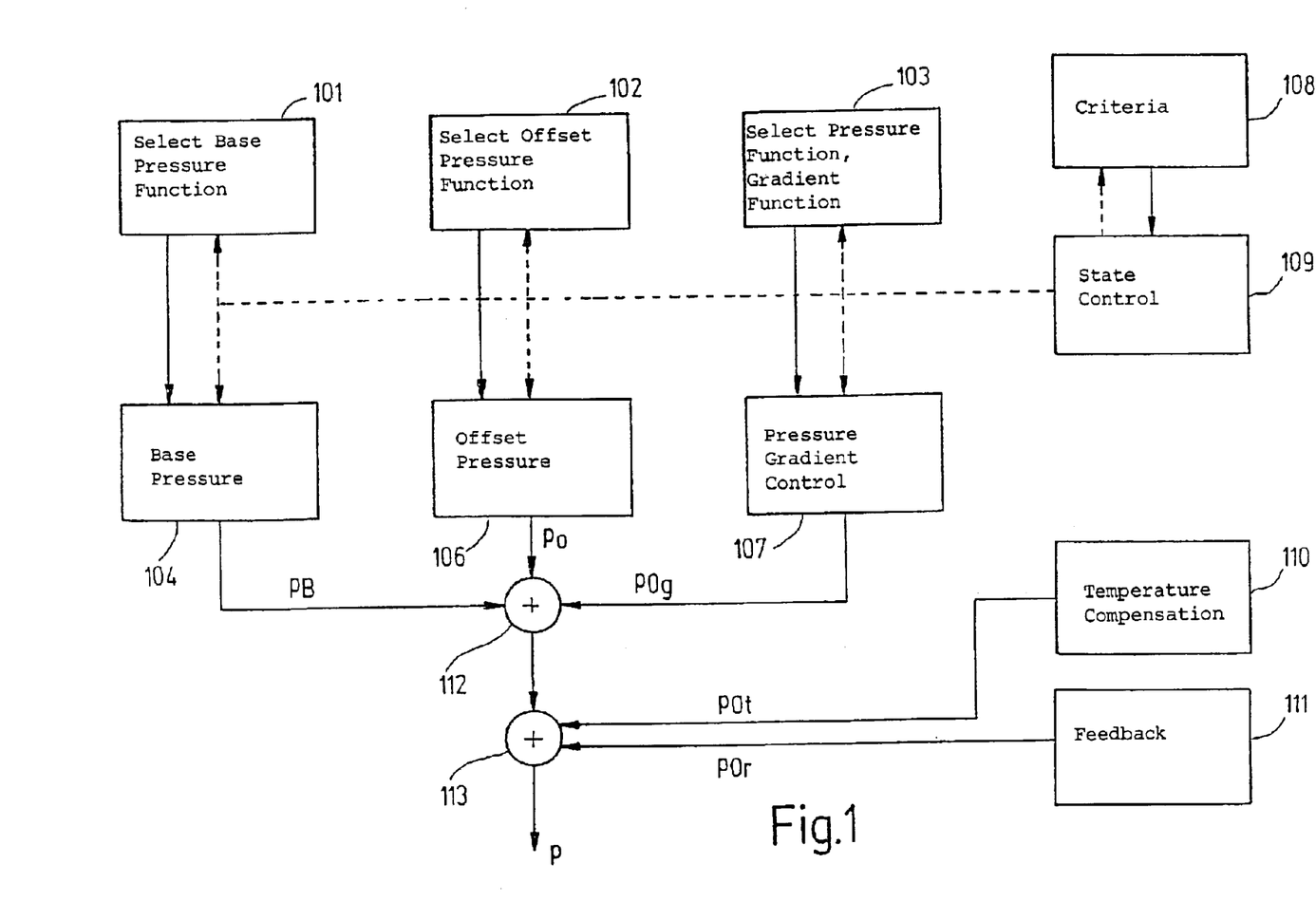
FIG. 1 shows a block circuit diagram of the pressure control according to the invention.

FIG. 1 shows a schematic block diagram of an embodiment of the pressure control according to the invention. In block 101, a base pressure function is selected which can be a constant, a function of the first order or another suitable function. With the aid of the base pressure function selected in block 101, the base pressure can be determined in block 104. In block 102, an offset pressure function is selected which likewise can be defined by a constant, a function of the first order or another suitable function. In block 106, the offset pressure is correspondingly determined. In block 107, a pressure-gradient function is selected which, as a rule, includes the time-dependent derivative of a pressure and which likewise can be defined by a constant, a function of the first order or another function. The trace of the pressure gradient is determined in block 107. Block 104 supplies a base pressure $p_s$, which is supplied to an adder 112. An offset pressure $p_O$ and $p_{Og}$ is supplied to this adder 112 from blocks 106 and 107. The output of the adder 112 is connected to the input of an additional adder 113 to which an offset pressure $p_{Ot}$ of a temperature compensating device 110 as well as an offset pressure $p_{Or}$ of a feedback device 111 are supplied. The adder 113 supplies the desired pressure at its output. A state control 109 is connected to the blocks 101 to 107 as well as a block 108. Block 108 monitors the fulfillment of criteria. A fulfillment of a criterion can lead to a change of the state from a current state z(t) to a subsequent state z(t+1). In this way, it is made possible that the blocks 101 to 107 always operate in correspondence to the current state.

Figure 2:
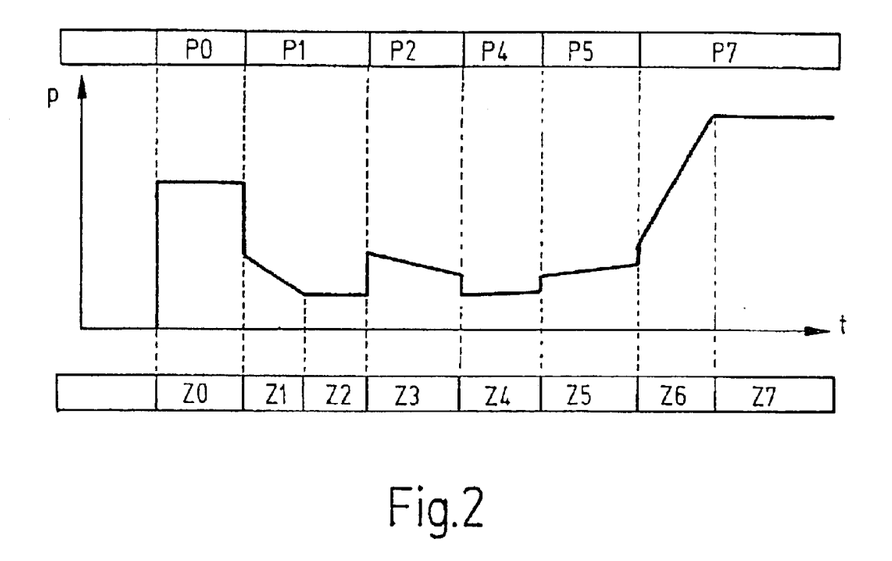
FIG. 2 is an example for a pressure trace during a shift operation as well as an example for the assignment of states to phases.

FIG. 2 shows an example for a pressure trace during a shift operation as well as an example for the assignment of states to phases. FIG. 2 shows the interaction of the pressure control of the invention with a shift sequence control, which coordinates shifts corresponding to the changes of constellations in a transmission. Here, a change of the constellation in the transmission results in a change of the force transmission of the transmission. The sequence of the shifting shown in FIG. 2 is subdivided into phases P0, P1, P2, P4, P5 and P7. In the gear change shown in FIG. 2, the phases P3 and P6 are not used, but they can be provided in other shifts of gear changes. As shown in FIG. 2, a state Z0 is assigned to the phase P0. The states Z1 and Z2 are assigned to the phase P1. The state Z3 is assigned to the phase P2. The state Z4 is assigned to the phase P4. The state Z5 is assigned to the phase P5 and the states Z6 and Z7 are assigned to the phase P7. Each state causes a pressure trace characteristic for this state as likewise can be seen in FIG. 2.

Figure 3:
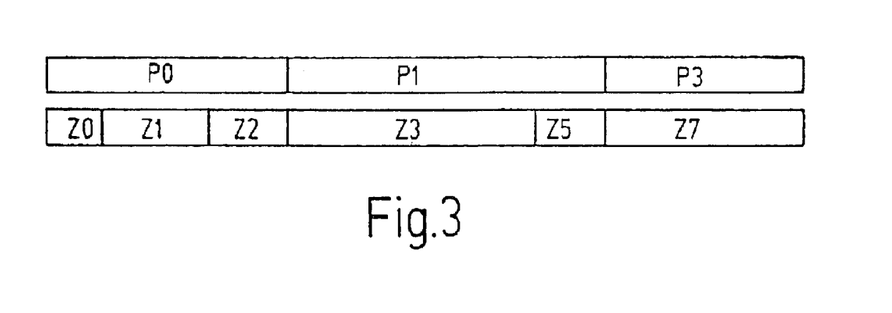
FIG. 3 is another example for assigning states to phases.

FIG. 3 shows a further example for assigning states to phases. According to FIG. 3, the states Z0, Z1 and Z2 are assigned to the phase P0. The states Z3 and Z5 are assigned to the phase P1 and the state Z7 is assigned to the phase P3. Even though several states are assigned to each of the phases P0 and P1 in accordance with FIG. 3, the phase boundaries are coincident with the state boundaries.

Figure 4:
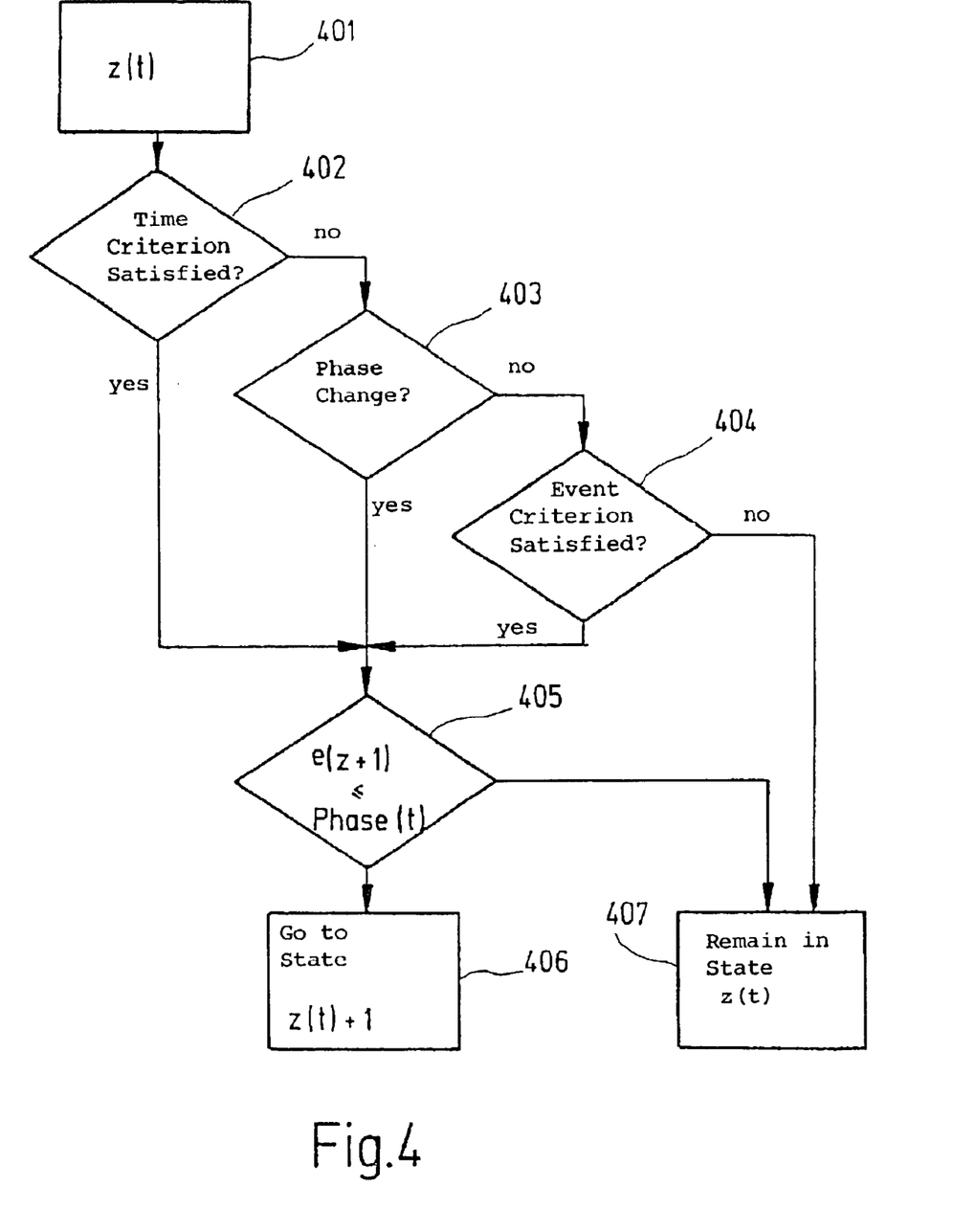
FIG. 4 is a flowchart which shows when there is a change from a current state to a subsequent state.

FIG. 4 shows a flowchart, which explains when there is a change from a current state to a subsequent state. In block 401, the pressure circuit is in state z(t). In block 402, a check is made as to whether a time criterion is satisfied. If this is the case, then there is a branching to block 405, which is explained hereinafter. If it is determined in block 402 that no time criterion is satisfied, then there is a branching to block 403 wherein a check is made as to whether a phase change is about to occur. If this is the case, then there is likewise a branching to block 405. If it is determined in block 403 that no phase change takes place, then there is a branching to block 404 wherein a check is made as to whether an event criterion is satisfied. If this is the case, then there is likewise a branching to block 405. Block 405 checks whether the next state is assigned to a phase, which is less than or equal to the current phase. If this is the case, then there is a change to a subsequent state, which is given by z(t)+1. Otherwise, there is a stay in state z(t) (block 407).

Figure 5:
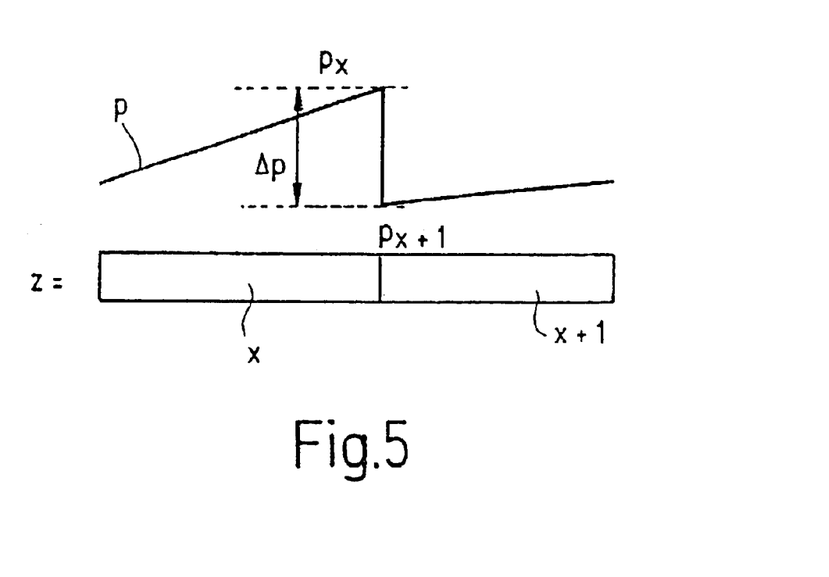
FIG. 5 is an example of a pressure trace wherein the pressure is changed by a pregiven value.

FIG. 5 shows an example of a pressure trace wherein the pressure is changed by a pregiven value. This function is preferably active only during a state change. In this case, the pressure (p) is changed by a specific amount Δp in accordance with the following equation:

$$p_{x+1} = p_x + \Delta p$$

wherein $p_x$ is the value of the pressure before the state change, which takes place via a change from state z(x) to the subsequent state z(x+1).

Figure 6:
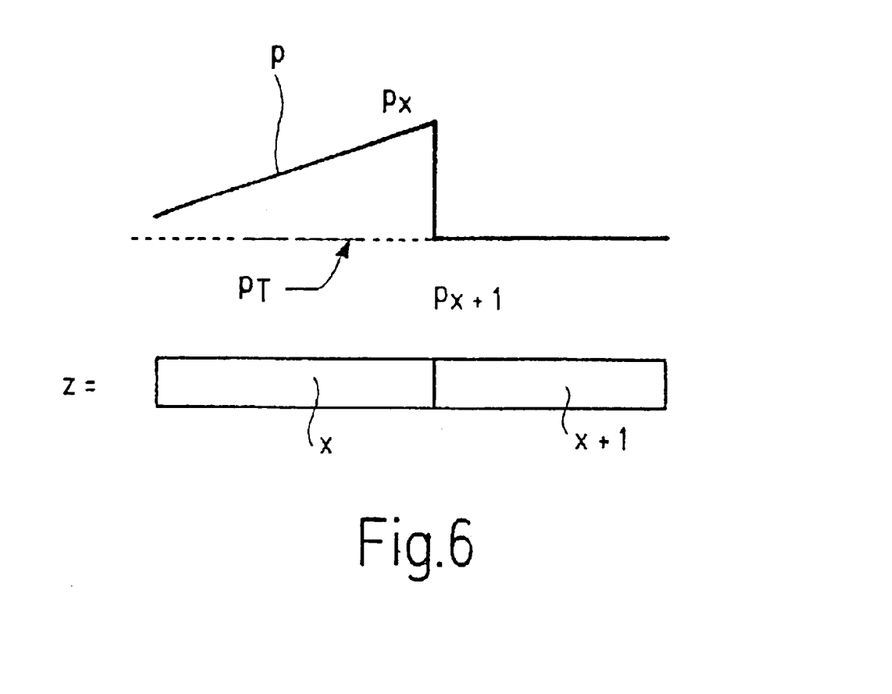
FIG. 6 is an example of a pressure trace wherein the pressure is adjusted to a pregiven value.

FIG. 6 shows an example for a pressure trace wherein the pressure is adjusted to a pregiven value. This function defines the pressure in accordance with the following equation:

$$p_{x+1} = p_T.$$

The pressure $p_T$ is an absolute pressure value, that is, it is independent of the pressure present in advance of the state change. The base pressure $p_B$ is preferably inactivated in this case, that is, that changes of the base pressure $p_B$ are not considered.

Figure 7:
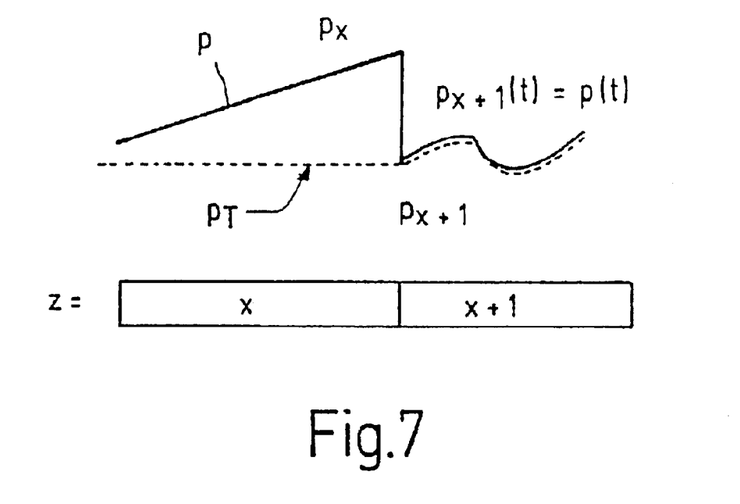
FIG. 7 is an example of a pressure trace wherein the pressure is first brought to a pregiven value and thereafter is adjusted in correspondence to the trace of a base pressure function.

FIG. 7 shows an example of a pressure trace wherein the pressure is first brought to a pregiven value and thereafter is adjusted in correspondence to the trace of a base pressure function. The behavior of this function is similar to that of the function of FIG. 6. With a change from state z(x) to the subsequent state z(x+1), the pressure is first adjusted in accordance with the following equation:

$$p_{x+1} = p_T.$$

Thereafter, the trace of the pressure is adjusted in correspondence to the trace of a base pressure function and a pressure trace as shown, for example, in FIG. 7 can be utilized when a change of a highly dynamic signal should influence the pressure trace (for example, the opening of the throttle flap).

Figure 8:
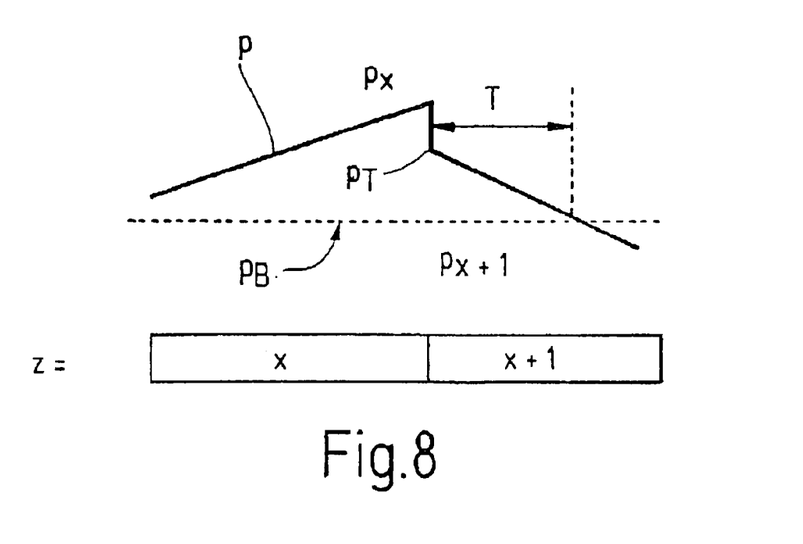
FIG. 8 is an example of a pressure trace wherein the pressure is first adjusted to a computed value, with this value being determined from a target pressure and the current pressure gradient; and, FIG. 9 is an example of a pressure trace having different gradients within a state.

FIG. 8 shows an example of a pressure trace, wherein the pressure is first adjusted to a computed value $P_T$, wherein this value can be determined from a target pressure and the current pressure gradient via the following equation:

$$p_T = p_B - p_{grad} \cdot T.$$

This means that the base pressure is reached after a time t=T. Here, it can be provided that the gradient is no longer automatically stopped at time point t=T; rather, there is a continuation up to the end of the state.

Figure 9:
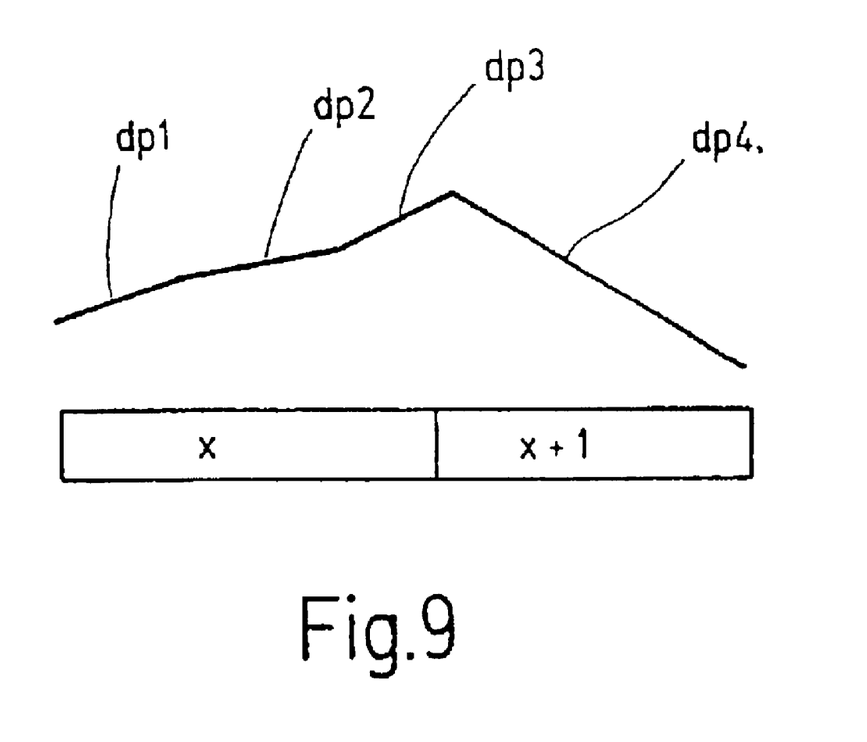

FIG. 9 shows an example of a pressure trace having different gradients within a state. Here, the curve segments are identified by different slopes with $dp_1$, $dp_2$, $dp_3$ and $dp_4$.

The above description of the embodiments according to the present invention serves only for illustrative purposes and does not serve the purpose of limiting the invention. Various changes and modifications are possible in the context of the invention without leaving the extent of the invention as well as its equivalents.

What is claimed is:

1. A pressure control for a program-controlled drive of at least one pressure actuating member in order to influence the hydraulic constellation in a transmission via a pressure (p) in said transmission, the pressure control comprising:

means for causing said program-controlled drive to take place via changes of states (z; Z0, Z1, Z2, Z3, Z4, Z5, Z6, Z7) from current states (z(t)) to subsequent states (z(t+1));

means for configuring the states (z; Z0, Z1, Z2, Z3, Z4, Z5, Z6, Z7) without a change of program; and, wherein criteria are provided including event criteria and that a change from a current state (z(t)) to a subsequent state (z(t+1)) takes place with a satisfaction of at least one criterion.

2. The pressure control of claim 1, wherein the states (z; Z0, Z1, Z2, Z3, Z4, Z5, Z6, Z7) are coordinated via a state or status machine.

3. The pressure control of claim 1, wherein the criteria include time criteria.

4. The pressure control of claim 1, wherein the pressure control coacts with a shift sequence control, which coordinates shifts, which correspond to changes of constellations in a transmission, wherein a change of the constellation results in a change of the force transmission of the transmission; and, wherein a sequence of a shifting is subdivided into phases (P0, P1, P2, P3, P4, P5, P6, P7).

5. The pressure control of claim 1, wherein the states (z; Z0, Z1, Z2, Z3, Z4, Z5, Z6, Z7) are assigned to the phases (P0, P1, P2, 23, P4, P5, P6, P7).

6. The pressure control of claim 1, wherein several states (z; Z0, Z1, Z2; Z3, Z5) are assigned to one phase (P0; P1).

7. The pressure control of claim 1, wherein a phase (e(z)) is assigned to each state (z) and that the following applies:

$$z(t+1) = \begin{cases} z(t)+1; & \text{if } e(z) < \text{phase}(t) \text{ and } e(z+1) \le \text{phase}(t) \\ z(t)+1; & \text{if } trg_{m(z)} = 1 \text{ and } e(z+1) \le \text{phase}(t) \\ z(t); & \text{otherwise} \end{cases}$$

wherein: $trg_{m(z)} = 1$ represents a condition which is satisfied when a criterion is satisfied; and, wherein the phase (t) relates to a subsequent phase insofar as a phase change is about to occur and e(z+1) relates to a subsequent phase.

8. The pressure control of claim 1, wherein a desired pressure trace ($p_s$) at a time point (t) is given by:

$$p_s(t) = p_s p_s(t) + p_0(t),$$

wherein $p_s$ is a base pressure and $p_0$ is an offset pressure.

9. The pressure control of claim 1, wherein the following applies for the base pressure ($p_s$):

$$p_s(t) = f_{i(z)}(t, \vec{x}) \text{ with } z = z(t),$$

wherein: $f_{i(z)}$ is a base pressure function which is selectable from a quantity i of base pressure functions; and, wherein the vector $\vec{x}$ indicates the states of the transmission and/or of the ambient.

10. The pressure control of claim 1, wherein the following applies for the offset pressure ($p_0$):

$$p_o(t) = \begin{cases} p_o(t-1) + \int g_{j(z)}(t, \vec{x}) dt; & \text{if } z := z(t) = z(t-1) \\ h_{k(z)}(t, p_o(t-1), \vec{x}); & \text{if } z := z(t) \ne z(t-1) \end{cases}$$

wherein $g_{j(z)}(t, \vec{x})$ is a pressure gradient function, which is selectable from a quantity j of gradient functions; and, wherein $h_{k(z)}(t, p_O(t-1), \vec{x})$ is a state change function which is selectable from a quantity k of state change functions; and wherein the vector $\vec{x}$ indicates the state of the transmission and/or of the ambient; and, wherein $p_O$ is an offset pressure.

11. The pressure control of claim 1, wherein the states include the type of shift and/or the output rpm and/or the oil temperature and/or the engine rpm and/or the engine output torque and/or the throttle flap position.

12. The pressure control of claim 1, wherein the pressure control includes a temperature compensating device which compensates temperature-dependent non-linearities and/or that the pressure control includes a feedback device which feeds back the transmission variables and/or the ambient variables.

13. A method for the program-controlled drive of at least one pressure actuating member in order to influence the hydraulic constellation in a transmission via the pressure (p), the method comprising the steps of:
  causing the program-controlled drive to take place via changes of states (z; Z0, Z1, Z2, Z3, Z4, Z5, Z6, Z7) from current states (z(t)) to subsequent states (z(t+1));
  configuring the states (z; Z0, Z1, Z2, Z3, Z4, Z5, Z6, Z7) without a change of program; and,
  wherein criteria are provided including event criteria and a change from a current state (z(t)) takes place to a subsequent state (z(t+1) with a satisfaction of at least one criterion.

14. The method of claim 13, wherein the states (z; Z0, Z1, Z2, Z3, Z4, Z5, Z6, Z7) are coordinated via a state machine.

15. The method of claim 13, wherein the criteria include time criteria.

16. The method of claim 13, wherein the method coacts with a method for coordinating shift sequences, which correspond to changes of constellations in a transmission, wherein a change of the constellation results in a change of the force transmission of the transmission; and, wherein a sequence of a shift is subdivided into phases (P0, P1, P2, P3, P4, P5, P6, P7).

17. The method of claim 13, wherein the states (z; Z0, Z1, Z2, Z3, Z4, Z5, Z6, Z7) are assigned to the phases (P0, P1, P2, P3, P4, P5, P6, P7).

18. The method of claim 13, wherein several states (z; Z0, Z1, Z2; Z3, Z5) are assigned to one phase (P0; P1).

19. The method of claim 13, wherein a phase (e(z)) is assigned to each state (z) and that the following applies:

$$z(t+1) = \begin{cases} z(t)+1; & \text{if } e(z) < \text{phase}(t) \text{ and } e(z+1) \leq \text{phase}(t) \\ z(t)+1; & \text{if } trg_{m(z)} = 1 \text{ and } e(z+1) \leq \text{phase}(t) \\ z(t); & \text{otherwise} \end{cases}$$

wherein: $trg_{m(z)}=1$ represents a condition which is satisfied when a criterion is satisfied; and, wherein the phase (t) relates to a subsequent phase insofar as a phase change is about to occur and e(z+1) relates to a subsequent phase.

20. The method of claim 13, wherein a desired pressure trace ($p_s$) at a discrete time point (t) is given by:

$$p_s(t) = p_s p_s(t) + p_O(t),$$

wherein $p_s$ is a base pressure and $p_O$ is an offset pressure.

21. The method of claim 13, wherein the following applies for the base pressure ($p_s$):

$$p_s(t) = f_{i(z)}(t, \vec{x}) \text{ with } z=z(t),$$

wherein: $f_{i(z)}$ is a base pressure function which is selectable from a quantity i of base pressure functions; and, wherein the vector $\vec{x}$ indicates the states of the transmission and/or of the ambient.

22. The method of claim 13, wherein the following applies for the offset pressure ($p_O$):

$$p_o(t) = \begin{cases} p_o(t-1) + \int g_{j(z)}(t, \vec{x}) dt; & \text{if } z := z(t) = z(t-1) \\ h_{k(z)}(t, p_o(t-1), \vec{x}); & \text{if } z := z(t) \neq z(t-1) \end{cases}$$

wherein $g_{j(z)}(t, \vec{x})$ is a pressure gradient function, which is selectable from a quantity j of gradient functions; and, wherein $h_{k(z)}(t, p_O(t-1), \vec{x})$ is a state change function which is selectable from a quantity k of state change functions; and wherein the vector $\vec{x}$ indicates the states of the transmission and/or of the ambient and wherein $p_O$ is an offset pressure.

23. The method of claim 13, wherein the states include the type of shift and/or the output rpm and/or the oil temperature and/or the engine rpm and/or the engine output torque and/or the throttle flap position.

24. The method of claim 13, wherein temperature-dependent non-linearities are compensated by a temperature compensating device and/or that transmission variables and/or ambient variables are fed back via a feedback device.

25. A pressure control for a program-controlled drive of at least one pressure actuating member in order to influence the hydraulic constellation in a transmission via a pressure (p) in said transmission, the pressure control comprising:
  means for causing said program-controlled drive to take place via changes of states (z; Z0, Z1, Z2, Z3, Z4, Z5, Z6, Z7) from current states (z(t)) to subsequent states (z(t+1)); and,
  means for configuring the states (z; Z0, Z1, Z2, Z3, Z4, Z5, Z6, Z7) without a change of program; and,
  wherein a phase (e(z)) is assigned to each state (z) and that the following applies:

$$z(t+1) = \begin{cases} z(t)+1; & \text{if } e(z) < \text{phase}(t) \text{ and } e(z+1) \leq \text{phase}(t) \\ z(t)+1; & \text{if } trg_{m(z)} = 1 \text{ and } e(z+1) \leq \text{phase}(t) \\ z(t); & \text{otherwise} \end{cases}$$

wherein: $trg_{m(z)}=1$ represents a condition which is satisfied when a criterion is satisfied; and, wherein the phase (t) relates to a subsequent phase insofar as a phase change is about to occur and e(z+1) relates to a subsequent phase.

26. A pressure control for a program-controlled drive of at least one pressure actuating member in order to influence the hydraulic constellation in a transmission via a pressure (p) in said transmission, the pressure control comprising:
  means for causing said program-controlled drive to take place via changes of states (z; Z0, Z1, Z2, Z3, Z4, Z5, Z6, Z7) from current states (z(t)) to subsequent states (z(t+1)); and,
  means for configuring the states (z; Z0, Z1, Z2, Z3, Z4, Z5, Z6, Z7) without a change of program; and,
  wherein the following applies for the base pressure ($p_s$):

$$p_s(t) = f_{i(z)}(t, \vec{x}) \text{ with } z=z(t)$$

wherein: $f_{i(z)}$ is a base pressure function which is selectable from a quantity i of base pressure functions; and, wherein the vector $\vec{x}$ indicates the states of the transmission and/or of the ambient.

27. A pressure control for a program-controlled drive of at least one pressure actuating member in order to influence the hydraulic constellation in a transmission via a pressure (p) in said transmission, the pressure control comprising:

means for causing said program-controlled drive to take place via changes of states (z; Z0, Z1, Z2, Z3, Z4, Z5, Z6, Z7) from current states (z(t)) to subsequent states (z(t+1)); and, means for configuring the states (z; Z0, Z1, Z2, Z3, Z4, Z5, Z6, Z7) without a change of program; and, wherein the following applies for the offset pressure ($p_O$):

$$p_o(t) = \begin{cases} p_o(t-1) + \int g_{j(z)}(t, \vec{x}) dt, & \text{if } z := z(t) = z(t-1) \\ h_{k(z)}(t, p_o(t-1), \vec{x}); & \text{if } z := z(t) \neq z(t-1) \end{cases}$$

wherein $g_{j(z)}(t, \vec{x})$ is a pressure gradient function, which is selectable from a quantity j of gradient functions; and, wherein $h_{k(z)}(t, p_O(t-1), \vec{x})$ is a state change function which is selectable from a quantity k of state change functions; and wherein the vector $\vec{x}$ indicates the state of the transmission and/or of the ambient and wherein $p_O$ is an offset pressure.

28. A pressure control for a program-controlled drive of at least one pressure actuating member in order to influence the hydraulic constellation in a transmission via a pressure (p) in said transmission, the pressure control comprising:

means for causing said program-controlled drive to take place via changes of states (z; Z0, Z1, Z2, Z3, Z4, Z5, Z6, Z7) from current states (z(t)) to subsequent states (z(t+1)); and, means for configuring the states (z; Z0, Z1, Z2, Z3, Z4, Z5, Z6, Z7) without a change of program; and, wherein the pressure control includes a temperature compensating device which compensates temperature-dependent non-linearities and/or that the pressure control includes a feedback device which feeds back the transmission variables and/or the ambient variables.

29. A method for the program-controlled drive of at least one pressure actuating member in order to influence the hydraulic constellation in a transmission via the pressure (p), the method comprising the steps of:

causing the program-controlled drive to take place via changes of states (z; Z0, Z1, Z2, Z3, Z4, Z5, Z6, Z7) from current states (z(t)) to subsequent states (z(t+1));

configuring the states (z; Z0, Z1, Z2, Z3, Z4, Z5, Z6, Z7) without a change of program; and, wherein a phase (e(z)) is assigned to each state (z) and that the following applies:

$$z(t+1) = \begin{cases} z(t)+1; & \text{if } e(z) < \text{phase}(t) \text{ and } e(z+1) \leq \text{phase}(t) \\ z(t)+1; & \text{if } trg_{m(z)} = 1 \text{ and } e(z+1) \leq \text{phase}(t) \\ z(t); & \text{otherwise} \end{cases}$$

wherein: $trg_{m(z)}=1$ represents a condition which is satisfied when a criterion is satisfied; and, wherein the phase (t) relates to a subsequent phase insofar as a phase change is about to occur and e(z+1) relates to a subsequent phase.

30. A method for the program-controlled drive of at least one pressure actuating member in order to influence the hydraulic constellation in a transmission via the pressure (p), the method comprising the steps of:

causing the program-controlled drive to take place via changes of states (z: Z0, Z1, Z2, Z3, Z4, Z5, Z6, Z7) from current states (z(t)) to subsequent states (z(t+1));

configuring the states (z; Z0, Z1, Z2, Z3, Z4, Z5, Z6, Z7) without a change of program; and, wherein the following applies for the base pressure ($P_s$):

$$p_s(t) = f_{i(z)}(t, \vec{x}) \text{ with } z=z(t),$$

wherein: $f_{i(z)}$ is a base pressure function which is selectable from a quantity i of base pressure functions; and, wherein the vector $\vec{x}$ indicates the states of the transmission and/or of the ambient.

31. A method for the program-controlled drive of at least one pressure actuating member in order to influence the hydraulic constellation in a transmission via the pressure (p), the method comprising the steps of:

causing the program-controlled drive to take place via changes of states (z; Z0, Z1, Z2, Z3, Z4, Z5, Z6, Z7) from current states (z(t)) to subsequent states (z(t+1));

configuring the states (z; Z0, Z1, Z2, Z3, Z4, Z5, Z6, Z7) without a change of program; and, wherein the following applies for the offset pressure ($p_O$):

$$p_o(t) = \begin{cases} p_o(t-1) + \int g_{j(z)}(t, \vec{x}) dt, & \text{if } z := z(t) = z(t-1) \\ h_{k(z)}(t, p_o(t-1), \vec{x}); & \text{if } z := z(t) \neq z(t-1) \end{cases}$$

wherein $g_{j(z)}(t, \vec{x})$ is a pressure gradient function, which is selectable from a quantity j of gradient functions; and, wherein $h_{k(z)}(t, p_O(t-1), \vec{x})$ is a state change function which is selectable from a quantity k of state change functions; and wherein the vector $\vec{x}$ indicates the states of the transmission and/or of the ambient and wherein $p_O$ is an offset pressure.

32. A method for the program-controlled drive of at least one pressure actuating member in order to influence the hydraulic constellation in a transmission via the pressure (p), the method comprising the steps of:

causing the program-controlled drive to take place via changes of states (z; Z0, Z1, Z2, Z3, Z4, Z5, Z6, Z7) from current states (z(t)) to subsequent states (z(t-1));

configuring the states (z; Z0, Z1, Z2, Z3, Z4, Z5, Z6, Z7) without a change of program; and, wherein temperature-dependent non-linearities are compensated by a temperature compensating device and/or that transmission variables and/or ambient variables are fed back via a feedback device.

* * * * *

UNITED STATES PATENT AND TRADEMARK OFFICE
CERTIFICATE OF CORRECTION

PATENT NO.    : 6,853,900 B2
DATED         : February 8, 2005
INVENTOR(S)   : Bernd Rapp et al.

It is certified that error appears in the above-identified patent and that said Letters Patent is hereby corrected as shown below:

Column 2,
Line 59, delete "$p_s(t) = p_s p_s(t) + p_o(t)$," and insert -- $p_s(t) = p_B(t) + p_o(t)$, -- therefor.
Line 61, delete "$p_s$" and insert -- $p_B$ -- therefor.

Column 6,
Line 45, delete "$p_s(t) = p_s p_s(t) + p_o(t)$," and insert -- $p_s(t) = p_B(t) + p_o(t)$, -- therefor.
Line 47, delete "$p_s$" and insert -- $p_B$ -- therefor.
Line 49, delete "$(p_s)$" and insert -- $(P_B)$ -- therefor.

Line 51, delete "$p_s(t) = f_{i(z)}(t, \bar{x})$ with $z = z(t)$,"

and insert -- $p_B(t) = f_{i(z)}(t, \bar{x})$ with $z = z(t)$, -- therefor.

Column 7,
Line 27, delete "(z(t+1)" and insert -- (z(t+1)) -- therefor.
Line 60, delete "$p_s(t) = p_s p_s(t) + p_o(t)$," and insert -- $p_s(t) = p_B(t) + p_o(t)$, -- therefor.
Line 61, delete "$p_s$" and insert -- $p_B$ -- therefor.
Line 63, delete "$(p_s)$" and insert -- $(p_B)$ -- therefor.

Line 65, delete "$p_s(t) = f_{i(z)}(t, \bar{x})$ with $z = z(t)$,"

and insert -- $p_B(t) = f_{i(z)}(t, \bar{x})$ with $z = z(t)$, -- therefor.

Column 8,
Line 60, delete "$(p_s)$" and insert -- $(p_B)$ -- therefor.

Line 62, delete "$p_s(t) = f_{i(z)}(t, \bar{x})$ with $z = z(t)$,"

and insert -- $p_B(t) = f_{i(z)}(t, \bar{x})$ with $z = z(t)$, -- therefor.

UNITED STATES PATENT AND TRADEMARK OFFICE
CERTIFICATE OF CORRECTION

PATENT NO. : 6,853,900 B2
DATED : February 8, 2005
INVENTOR(S) : Bernd Rapp et al.

It is certified that error appears in the above-identified patent and that said Letters Patent is hereby corrected as shown below:

Column 10,
Line 7, delete "(z:Z0, Z1, Z2, Z3, Z4, Z5, Z6, Z7)" and insert -- (z; Z0, Z1, Z2, Z3, Z4, Z5, Z6, Z7) -- therefor.
Line 11, delete "($p_s$)" and insert -- ($p_B$) -- therefor.

Line 13, delete "$p_B(t)=f_{i(z)}(t,\bar{x})$ with $z=z(t)$,"

and insert -- $p_B(t)=f_{i(z)}(t,\bar{x})$ with $z=z(t)$, -- therefor.

Line 53, delete "(z(t- 1) )" and insert -- (z(t+1 ) ) -- therefor.

Signed and Sealed this

Seventeenth Day of May, 2005

JON W. DUDAS
*Director of the United States Patent and Trademark Office*